(12) United States Patent  
Bastian, II et al.

(10) Patent No.: US 8,893,872 B2  
(45) Date of Patent: Nov. 25, 2014

(54) CONCRETE ROLLER

(71) Applicant: Bastian Solutions, LLC, Indianapolis, IN (US)

(72) Inventors: William A. Bastian, II, Carmel, IN (US); Britt Calloway, Fredericksburg, VA (US)

(73) Assignee: Bastian Solutions, LLC, Indianapolis, IN (US)

( * ) Notice: Subject to any disclaimer, the term of this patent is extended or adjusted under 35 U.S.C. 154(b) by 63 days.

(21) Appl. No.: 13/719,672

(22) Filed: Dec. 19, 2012

(65) Prior Publication Data

US 2014/0166430 A1 Jun. 19, 2014

(51) Int. Cl.
- *B65G 13/00* (2006.01)
- *B65G 39/02* (2006.01)
- *B65G 39/09* (2006.01)

(52) U.S. Cl.
CPC ............... *B65G 39/02* (2013.01); *B65G 39/09* (2013.01)
USPC ............................................. 193/37; 198/780

(58) Field of Classification Search
USPC ............. 198/780; 193/37; 384/144, 147, 480, 384/484
See application file for complete search history.

(56) References Cited

U.S. PATENT DOCUMENTS

| | | | |
|---|---|---|---|
| 3,967,017 A * | 6/1976 | Marten | 427/454 |
| 4,028,786 A * | 6/1977 | Dempster | 492/8 |
| 4,312,444 A * | 1/1982 | Mushovic | 198/780 |
| 4,340,553 A * | 7/1982 | Fosse | 264/40.7 |
| 4,440,295 A * | 4/1984 | Blackwood-Murray et al. | 198/843 |
| 4,955,462 A | 9/1990 | Bilodeau et al. | |
| 5,064,406 A * | 11/1991 | Schutte | 474/166 |
| 5,433,308 A | 7/1995 | Gagnon | |
| 5,931,284 A * | 8/1999 | Foster | 198/750.5 |
| 6,684,960 B1 * | 2/2004 | Ng et al. | 172/22 |
| 6,694,690 B2 | 2/2004 | Li et al. | |
| 6,809,131 B2 | 10/2004 | Li et al. | |
| 6,911,076 B2 | 6/2005 | Keshmiri | |
| 7,572,501 B2 | 8/2009 | Li et al. | |
| 7,757,445 B2 * | 7/2010 | Disterhof et al. | 52/223.3 |
| 7,799,127 B2 | 9/2010 | Li et al. | |
| 8,382,391 B1 * | 2/2013 | Potter et al. | 404/6 |
| 8,602,197 B2 * | 12/2013 | Horling et al. | 193/37 |
| 2008/0261027 A1 | 10/2008 | Li et al. | |
| 2009/0035459 A1 | 2/2009 | Li et al. | |
| 2009/0075076 A1 | 3/2009 | Li et al. | |

OTHER PUBLICATIONS

U.S. Appl. No. 13/241,528, filed Sep. 23, 2011 to Calloway.

\* cited by examiner

*Primary Examiner* — Douglas Hess  
(74) *Attorney, Agent, or Firm* — Woodard, Emhardt, Moriarty, McNett & Henry LLP

(57) ABSTRACT

A conveyor roller includes a roller body that defines a fill cavity. A concrete material at least partially fills the fill cavity in the roller body. A bearing assembly is coupled to the roller body. The bearing assembly is configured to facilitate rotation of the roller body. The roller body acts as a mold to allow curing of the concrete material to occur even after final assembly of the conveyor roller. In one example of the manufacturing method, the concrete material is poured into one or more fill cavities inside the roller body, and bearing assemblies are attached to the opposite ends of the roller body. The concrete material can continue to cure even after the bearing assemblies are attached. In one example, the bearing assemblies act as plugs, thereby sealing the concrete material within the fill cavities of the roller body.

52 Claims, 12 Drawing Sheets

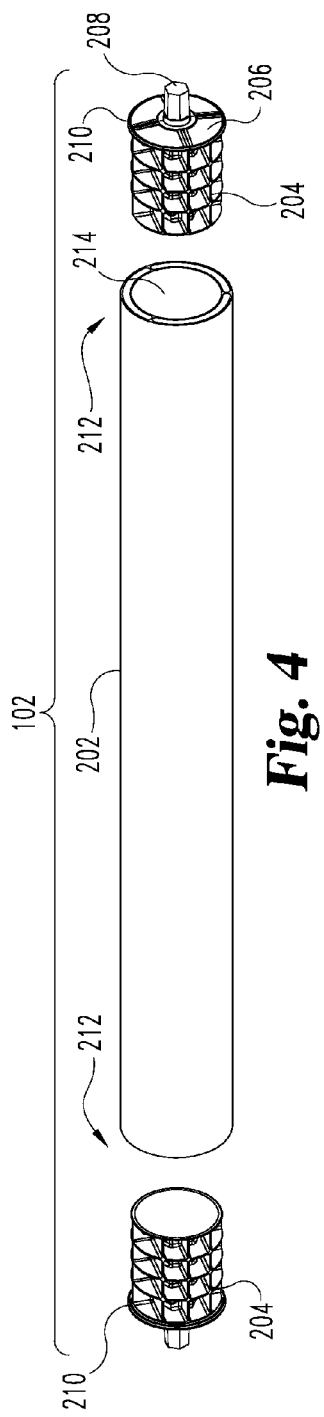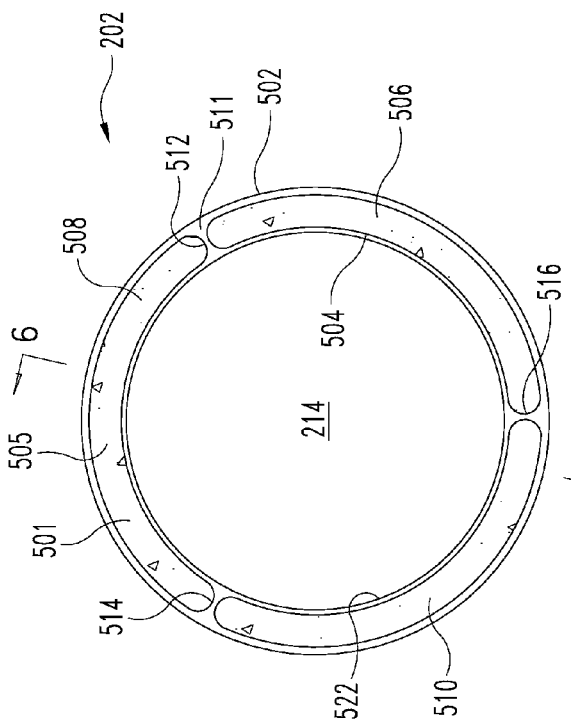

CONCRETE ROLLER

BACKGROUND

Conveyor rollers are extensively used throughout the world to transport a variety of materials in a wide range of industrial applications. Many facilities, such as manufacturing and distribution facilities, may contain well over a hundred miles of conveyors and have tens of thousands of conveyor rollers. These rollers are often required to carry heavy loads and therefore are most often made of carbon steel due to the high strength of the material.

However, steel rollers have a number of significant drawbacks. For example, steel rollers can be both thermally and electrically conductive which in turn can make them unsuitable for a large number of operational environments. Depending on a number of factors, the price of steel can dramatically vary from year to year and has recently tended to be more expensive. Steel rollers are also prone to rust in applications that require a wash down of the rollers, such as for food processing and/or in highly corrosive environments. Steel rollers have also been found to create an undesirable ringing noise when materials are transported over the rollers.

Various materials have been proposed to replace steel rollers, but none have experienced wide commercial adoption, except in some niche areas. As many in the field know, while concrete has great compressive strength, it has relatively low tensile strength. This aspect dissuaded many in the field from even considering concrete as a potential material. There have been a few rare proposals to incorporate concrete into roller conveyors. For example, polymer concrete conveyor rollers, such as in U.S. Pat. No. 4,955,462 to Bilodeau et al., have been proposed as one possible alternative. However, a number of drawbacks have prevented such rollers being widely adopted in a broad range of commercial applications. Thus, there needs to be an improvement in this field.

SUMMARY

During development of the concrete roller design described and illustrated herein, a number of significant drawbacks in conventional concrete roller designs were discovered and subsequently addressed. For example, looking at the polymer concrete roller in the previously mentioned U.S. Pat. No. 4,955,462 to Bilodeau et al., the body of the roller is made from moldable polymer concrete that is exposed. It was discovered that this design requires the concrete to be almost fully cured before final assembly of the roller which in turn delays shipping. The long curing times required for concrete rollers made production of these rollers commercially unfeasible. Moreover, the rough nature of the exposed concrete tended to damage conveyed items, and the rollers tended to chip as well as create dust. During use, wear patterns tended to form on the rollers which among other things increase noise and limit the operational life of the roller.

These issues as well as other issues have been addressed by the concrete roller design as described and illustrated herein. In one example, a roller body acts as a mold in which the concrete can be cured even after final assembly of the conveyor roller. The roller body also protects the items being transported from the rough surface of the concrete material. Moreover, the roller body can be made of material that has higher tensile strength then the concrete material, such as plastic, so as to enhance the overall tensile strength of the conveyor roller. To further enhance the tensile strength of the conveyor roller, the concrete material can include engineered cementitious concrete. Undesirable settling of the concrete material can occur within the roller body which in turn can lead to weakening of the concrete material. To address this issue, the roller body in one example segments the roller body such that it has multiple fill cavities. The roller body can further include spokes and other structures to further stiffen the conveyor roller. Depending on the requirements, the roller body can be solid such that it is completely filled with concrete, or it can be hollow.

With this design, an inexpensive alternative to relatively more expensive steel rollers is provided. While a number of materials have been proposed as a replacement of conventional steel rollers, none of them satisfy all the requirements when it comes to mechanical strength, performance, and price. The concrete roller design described herein addresses these issues by providing the capability to mimic the performance and strength of conventional steel rollers in a less expensive manner. For instance, the concrete roller can be designed to have the weight and inertial characteristics comparable to conventional steel rollers that are similarly sized. This design then allows the concrete roller to be introduced as a replacement part for conventional steel rollers. To provide even further superior performance, the roller body can be manufactured with a modular construction. In one particular example, the roller body includes an inner support structure received inside an outer sleeve. The inner support structure can be produced by joining together one or more support segments. These individuals support segments facilitate the creation of complex structures while using conventional manufacturing techniques such as injection molding.

As noted before, this design allows the conveyor roller to be assembled even before the concrete material is completely cured. In one example, the bearing assemblies include flanges that are used to seal the concrete material within the roller body. This allows curing of the concrete to occur during storage and/or shipping.

Further forms, objects, features, aspects, benefits, advantages, and embodiments of the present invention will become apparent from a detailed description and drawings provided herewith.

BRIEF DESCRIPTION OF THE DRAWINGS

FIG. 4 is an exploded view of the FIG. 2 conveyor roller assembly.

FIG. 5 is an end view of a roller body used in the FIG. 2 conveyor roller assembly.

DETAILED DESCRIPTION

Figure 1:
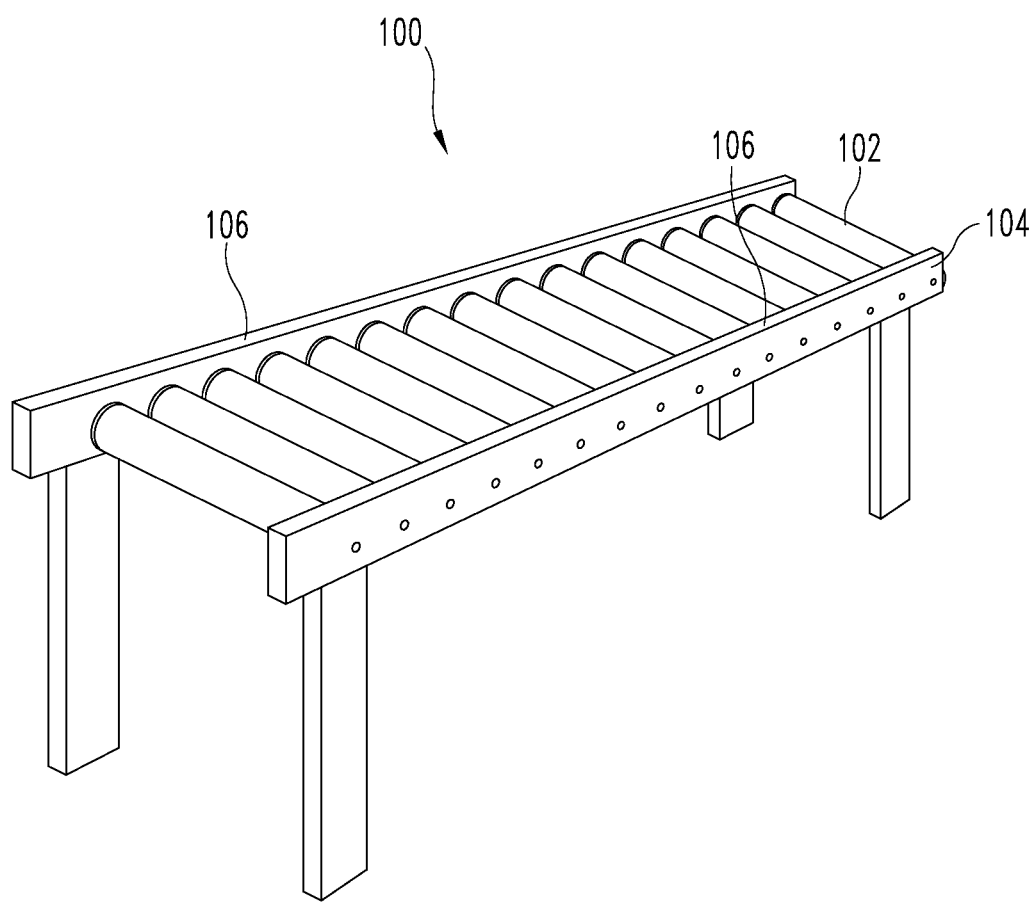
FIG. 1 is a perspective view of a conveyor system.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. Some embodiments of the invention are shown in great detail, although it will be apparent to those skilled in the relevant art that some features that are not relevant to the present invention may not be shown for the sake of clarity.

With respect to the specification and claims, it should be noted that the singular forms "a", "an", "the", and the like include plural referents unless expressly discussed otherwise. As an illustration, references to "a device" or "the device" include one or more of such devices and equivalents thereof. It also should be noted that directional terms, such as "up", "down", "top", "bottom", and the like, are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

The reference numerals in the following description have been organized to aid the reader in quickly identifying the drawings where various components are first shown. In particular, the drawing in which an element first appears is typically indicated by the left-most digit(s) in the corresponding reference number. For example, an element identified by a "100" series reference numeral will likely first appear in FIG. 1, an element identified by a "102" series reference numeral will likely first appear in FIG. 2, and so on.

FIG. 1 shows a perspective view of one example of a conveyor system 100 that can be used to transport various items. As shown, the conveyor system 100 includes one or more rollers 102 supported by a frame 104. In the illustrated embodiment, the frame 104 includes a pair of rails 106 between which the rollers 102 extend. The rollers 102 are configured to rotate relative to the rails 106 of the frame 104 in order to transport various items.

Figure 2:
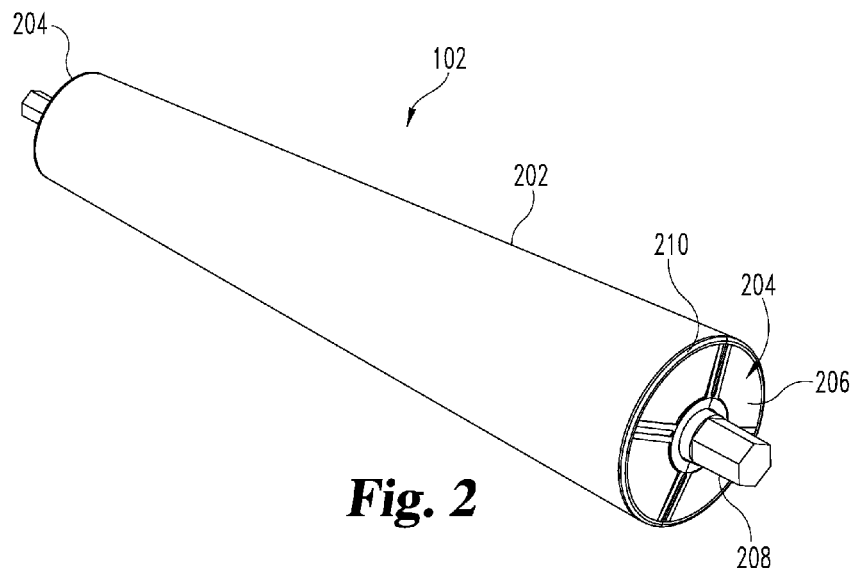
FIG. 2 is a perspective view of a conveyor roller assembly used in the FIG. 1 conveyor system.
Figure 3:
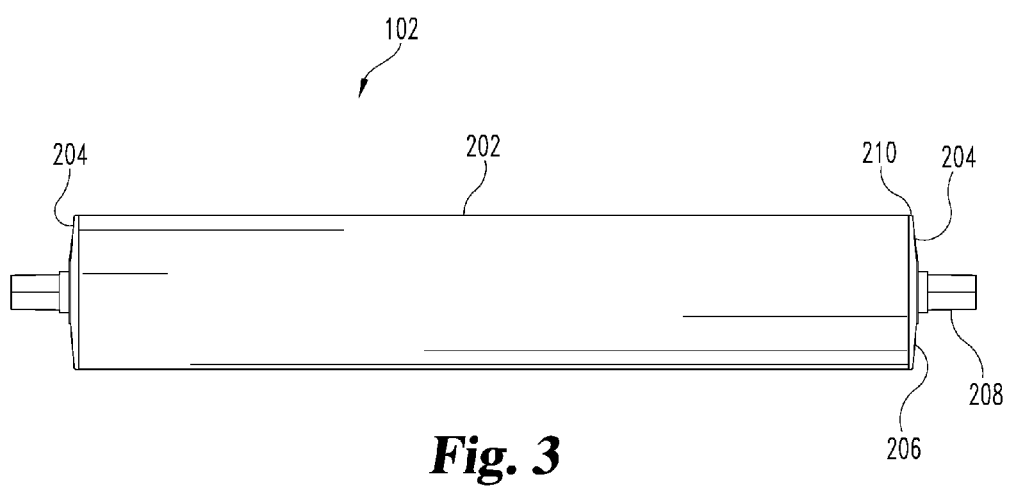
FIG. 3 is a plan view of the FIG. 2 conveyor roller assembly.

FIG. 2 shows a perspective view of one of the rollers 102 shown in FIG. 1, and FIG. 3 shows a plan view of the roller 102. Looking at FIG. 2, the conveyor roller 102 includes a roller body 202 and one or more end hubs or bearing assemblies 204 that are configured to engage the rails 106. One example of the end hub 204 that can be used in the roller 102 is described and illustrated in U.S. patent application Ser. No. 13/241,528, filed Sep. 23, 2011, which is incorporated by reference. As shown in FIGS. 2 and 3, the end hubs 204 are located on opposing ends of the roller body 202. Each end hub 204 includes a housing 206 and an axle stub or pin portion 208 that is configured to engage one of the rails 106. The axle stub 208 is configured to rotate relative to the housing 206 so that the roller 102 is able to rotate relative to the frame. The housing 206 includes a flange 210 that among other things acts as a stop so as to properly locate the end hub 204 relative to the roller body 202. As will be explained in further depth below, the flange 210 also is sized seal the ends of the roller body 202 so as to facilitate assembly of the roller 102 even when the concrete in the roller body 202 is not completely cured. The concrete can then complete the curing process during storage and/or shipping.

FIG. 4 shows an exploded view of the roller 102. As can be seen, the ends 212 of the roller body 202 have openings 214 configured to receive the axle hub 204. As noted before, the flange 210 can act as a stop so as to prevent over insertion of the axle hub 204. In this way, the bearing assembly 204 is prevented from sliding further into the roller body 202. In one example, the axle stubs 204 are held within the roller body 202 via a friction or interference fit.

FIG. 5 shows an end view of roller body 202 that is filled with concrete 501. Among other things, the roller body 202 generally acts as a mold for the concrete 501. This in turn allows the rest of the roller 102 to be assembled even if the concrete 501 has not fully cured. In one example, the roller body 202 is made of a material that has a relatively high tensile strength as compared to the concrete 501, and in one particular example, the roller body 202 is made of plastic. As noted before, while having relatively high compressive strength, concrete generally tends to have poor tensile strength and is prone to cracking. The roller body 202 acts as an outer jacket so as to improve the overall tensile strength of the roller 102 as well as maintains the integrity of the concrete 501 so that if any cracking does occur, the concrete 501 is held in place. This hybrid combination of materials ensures the strength of the roller 102 is adequate for most commercial environments. Moreover, concrete is generally less expensive than steel, which makes this roller design less expensive than conventional steel rollers. As alluded to before, many different type of materials have been proposed for rollers. However, it was discovered that the mechanical properties of these proposed rollers significantly differ from conventional steel rollers such that as they cannot be readily substituted for conventional steel rollers. For example, these non-steel rollers can have differing inertial properties or weight such that they have different spin characteristics as compared to conventional rollers. These differences in spinning or inertial characteristics can lead to skewing and jamming of items on unpowered roller conveyors as well as problematic mechanical issues for powered conveyors. With the illustrated design, the roller 102 is able to mimic the characteristics of steel rollers so that the roller 102 can be readily substituted for steel rollers. For example, the weight of the roller 102 can be comparable to a similarly sized steel roller such that the roller 102 is able to act as a less expensive replacement part for steel rollers. The roller body 202 also protects the items being transported as well as reduces roller wear as compared to conventional concrete rollers. Moreover, the roller body 202 protects the concrete 501 by preventing absorption of liquids into the concrete 501 which could lead to damage of the concrete 501 and/or transported items.

As mentioned before, concrete is known for its strength under compression; however, one major weakness is the low tensile strength (approximately 10-20% of its strength in compression) of concrete. Tensile loading that is near and/or greater than the tensile strength may cause crack initiation and catastrophic failure under a brittle failure mode. Reinforcing concrete with prestressed or stressed in situ steel and/or fiber can reduce the concrete matrix from being subject to tensile loads, thus allowing for a higher strength material with a lower cost.

In certain applications, creating prestressed concrete may be difficult or too costly, since it often requires specialized equipment. In one particular example, the concrete 501 includes an engineered cementitious concrete (ECC) that has a higher tensile strength without the need for prestressing. ECC is a composite material that is reinforced with fibers, such as polyvinylalcohol (PVA) fiber. This fiber may be used in a low volume fraction, such as 2-3% by volume, in a concrete mixture to create a concrete matrix with greater tensile strain capacities than a traditional concrete mixture. Tests done on this material have shown a higher relative strength in tension, greater resistance to catastrophic fatigue cracking, increased durability under reversed loading, and greater dynamic tensile loading capability under projectile impact. More specifically, in some cases, the tensile strain capacity may be approximately five hundred times greater than that of standard concrete aggregate mixtures.

When the ECC is loaded under tensile stress, multiple microcracks may be created. Due to the interspersing of the fibers throughout the material, many fibers will cross these microcracks and therefore allow for the stress to be distributed across the microcrack by way of the fiber. Under cyclical loading, microcracking has been found to result in strain hardening.

Engineered cementitious concrete also allows for a higher yield stress in reinforced concrete. Reinforced concrete is limited in its load carrying capacity by the yield stress of the reinforcing members. In a prestressed concrete beam, the reinforcing members are under an initial tensile stress that keeps the concrete in compression. When a live tensile load is applied to the beam, additional tensile stress is incurred on the reinforcing members. Since part of the tensile strength of the reinforcing member is used to compress the concrete, less tensile stress needs to be imparted onto the beam to reach the yield stress of the reinforcing member. Therefore the overall carrying capacity of the beam is limited to the yield stress of the reinforcing member. In addition, when a crack does occur in the brittle concrete matrix, the concrete no longer transfers any stress across the cracks that form. In a reinforced/ECC matrix, stresses are transferred from the reinforcement to the concrete matrix more uniformly, thus allowing for a yield stress much higher than the yield stress of reinforcing material.

In one example, the fibers in the concrete mixture are selected to optimize the concrete matrix for the highest tensile strain capacity. PVA fibers are often selected due to the high chemical bonds between the PVA fiber and the concrete and/or the appropriate frictional stresses at this interface. If the chemical bond and/or frictional interface between the fiber and the concrete mixture is too weak, the fibers will pull out and not transmit force across the microcrack. If the interaction between the fibers and the concrete mixture is too strong, the fibers will not stretch properly and the supporting concrete matrix may rupture. In one embodiment, the strength of the interaction between the fibers and the concrete mixture is in a selected range such that when microcracks form they will propagate to other locations in the concrete matrix, thus causing strain hardening in the macro level of the ECC material. It should be recognized that the roller body 202 holds the concrete 501 in place when microcracking occurs as well as relieves some of the tensile load applied to the concrete 501.

In the embodiment illustrated in FIG. 5, the roller body 202 includes an outer tube 502 and an inner tube 504. The inner tube 504 in the depicted embodiment is positioned concentrically within the outer tube 502, and both the outer tube 502 and inner tube 504 are circular. As will be discussed in more detail below, the outer tube 502 and inner tube 504 define one or more fill cavities 505 that are at least partially filled with the concrete material 501. In the illustrated example, the fill cavities 505 in the roller body 202 include first 506, second 508, and third 510 fill cavities. The individual fill cavities 505 are separated by one or more connecting walls or spokes 511. In the illustrated embodiment, the first 506, second 508, and third 510 fill cavities are respectively separated by first 512, second 514, and third 516 connecting walls or spokes. The spokes 511 help to segment the concrete 501 so as to minimize pooling or settling of the concrete 501, and the spokes 511 also enhance the rigidity of the roller 102. Again, the roller body 202 in essence forms an integral mold in which the concrete 501 is formed. The roller body 500 has an inner surface 522 that defines cavity 214 for receiving the axle stub 204 of the bearing assembly 204.

Figure 6:
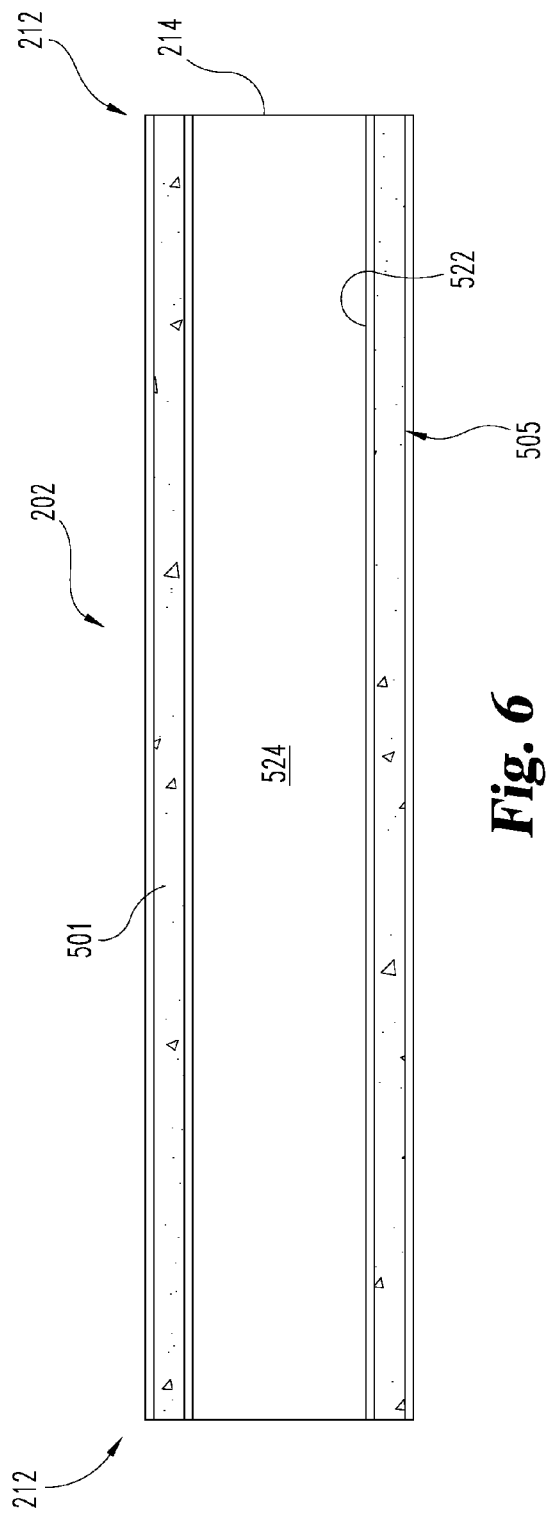
FIG. 6 is a cross-sectional view of the roller body used in the FIG. 2 conveyor roller assembly.

FIG. 6 is a cross sectional view of the roller body 202 along line 6-6 in FIG. 5. As shown, the roller body 202 having a concrete material 501 positioned inside the fill cavities 505 and the inner cavity 524 extending axially along the roller body 202 between the ends 212 of the roller body 202. In the illustrated embodiment, the cavity 524 extends through the entire length of the roller body 202 such that the roller body 202 is generally hollow. When hollow, the roller body 202 can be lighter such that the roller body 202 has a weight comparable to steel or other types of conveyor rollers.

Figure 7:
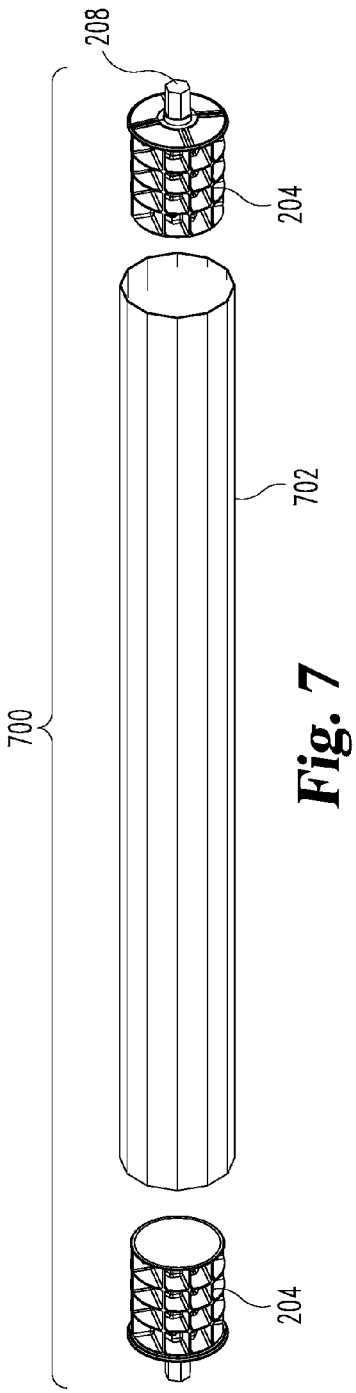
FIG. 7 is an exploded view of a conveyor roller assembly according to another embodiment.

FIG. 7 shows an exploded view of a conveyor roller 700 according to another embodiment. As can be seen, the roller 700 in FIG. 7 shares a number of features in common with the roller 102 described above with reference to FIGS. 2-6. For example, the roller 700 includes the end hubs 204 of the type described above. For the sake of brevity as well as clarity, these common components will not be described again in detail but reference is made to the previous discussion. As can be seen, the conveyor roller 700 in FIG. 7 includes a roller body 702 that is configured differently from the roller body 202 described above.

Figure 8:
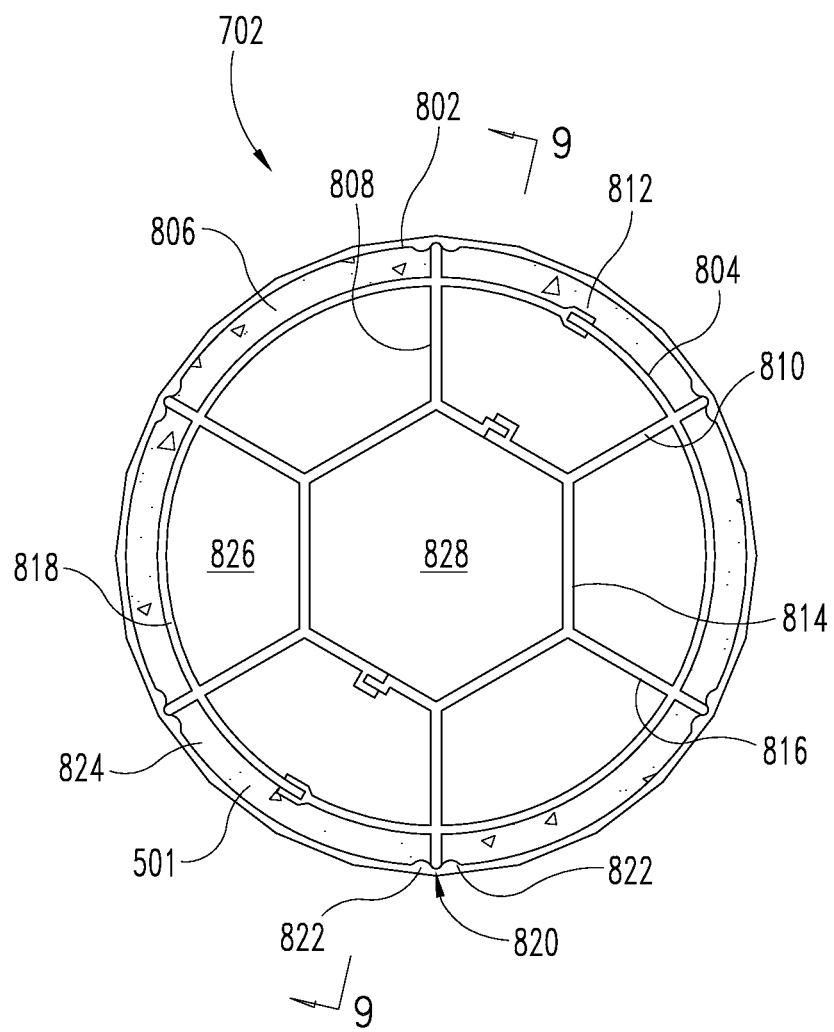
FIG. 8 is an end view of a roller body used in the FIG. 7 conveyor roller assembly.

FIG. 8 shows an end view of the roller body 702 filled with the concrete 501. The roller body 702 includes an outer sleeve 802 and an inner support structure 804 that is received inside the outer sleeve 802. Looking at FIG. 8, the inner support structure 804 has a modular construction. Specifically, the inner support structure 804 includes a series of support segments 806 that are joined together to form the complete inner support structure 804. In the illustrated embodiment, the first 808 and second 810 support segments are interlocked together to form the inner support structure 804. The support segments 806 are joined together via one or more coupling structures 812. In the illustrated embodiment, the coupling structures 812 utilize an interference or press-fit connection between the first 808 and second 810 support segments. By having this modular construction, the inner support structure 804 can have a more complex shape while still using conventional manufacturing techniques such as injection molding. This in turn allows the inner support structure 804 to provide additional strength at a lower cost. Looking at FIG. 8, the inner support structure 804 includes an inner hub 814 with spokes 816 extending radially outward from the inner hub 814 near the outer sleeve 802. The inner support structure 804 has a rim or felloe section 818 located at the outer radial end of the spokes 816. The spokes 816 are received within grooves 820 formed in the outer sleeve 802. The grooves are defined by a pair of beads 822 formed on the inner surface of the outer sleeve 802. The rim 818 along with the spokes 816 and the outer sleeve 802 form one or more fill chambers 824 in which the concrete 501 at least partially fills. Depending on the requirements, it should be recognized that an intermediate chamber 826 located between the rim 818 and the hub 814 along with the inner chambers 828 formed within the hub 814 can also be filled with concrete 501 in other examples. Again, the modular structure of the roller 702 allows the various support segments 806 to be formed in any number of inexpensive manners, such as through injection molding and/or extrusion, while at the same time provides sufficient rigidity and structural support.

Figure 9:
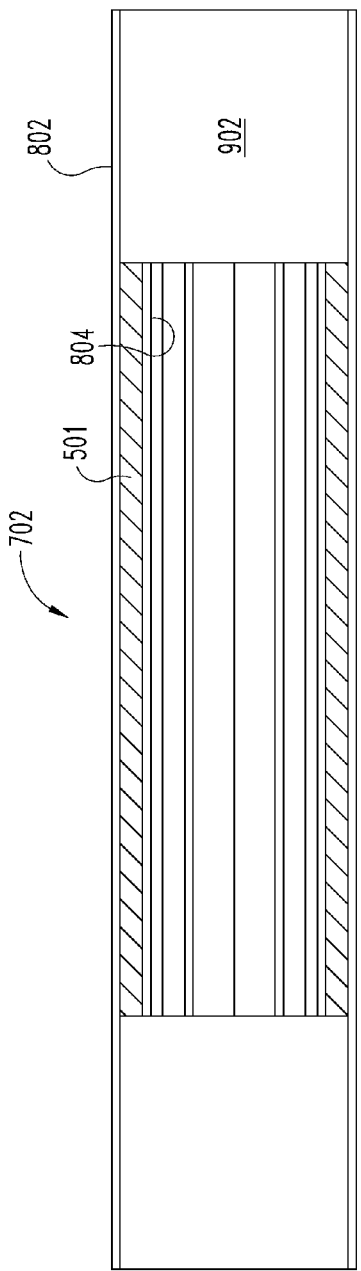
FIG. 9 is a cross-sectional view of the roller body used in the FIG. 7 conveyor roller assembly.

FIG. 9 shows a cross-sectional view of the roller body 702 as taken along line 9-9 in FIG. 8. As shown, the inner support structure 804 is received inside the outer sleeve 802. In this particular example, after the segments 806 are pressed fit together, the inner support structure 804 is slid within the outer sleeve 802 with the spokes 816 received within the grooves 820 of the outer sleeve 802. The concrete 501 fills the length of the fill chambers 824. As can be seen, the inner support structure 804 generally extends through a middle section of the outer sleeve 802 such that the opposing ends of the outer sleeve 802 form axle hub cavities 902 in which the axle hubs 204 are received.

Figure 10:
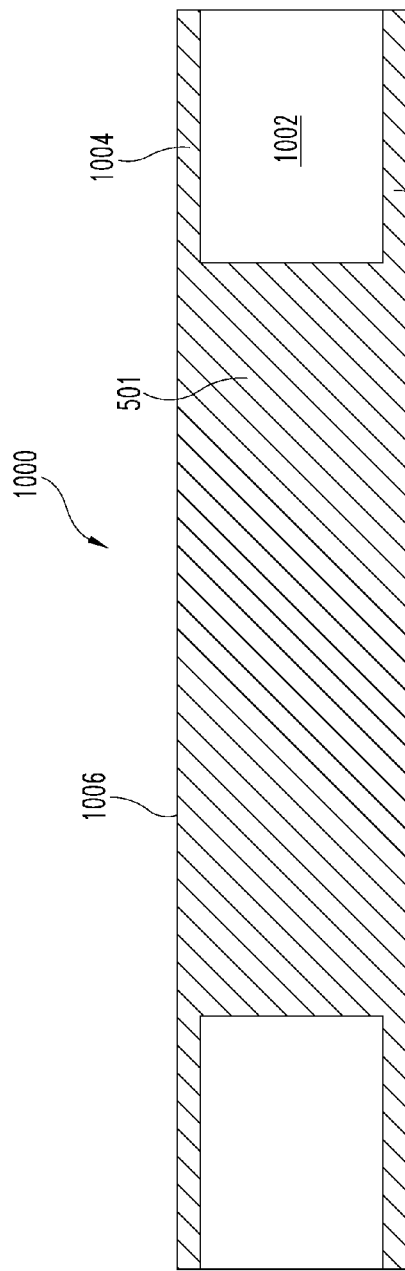
FIG. 10 is a cross-sectional view of another variation of a roller body.

FIG. 10 shows another embodiment of a roller body 1000 that is constructed with the concrete material 501 within cavities 1002 defined by sidewall portions 1004 at the ends of the roller body 1000. Cavities 1002 are arranged for receiving the bearing assemblies 204. As can be seen, rather than having a hollow body construction, the roller body 1000 in FIG. 10 has a solid body construction in which the concrete 501 fills the entire roller body 1000. In this particular embodiment, the roller body 1000 does not have an integrated mold for the concrete material, such as the outer and/or inner tube of the above-described embodiments.

The roller body 1000 has an outer surface 1006 that may either be the concrete material 501 or a layer or coating of another material on top of the concrete material 501. In many applications, an outer surface 1006 of concrete material may scratch and/or scuff the material traveling over the conveyor roller. Therefore, it may be preferred to position a layer or coating of another material over the outer surface 1006 of the concrete material 501. For example, a polytetraflouoroethylene, e.g., TEFLON®, may be coated on the outer surface 1006. As can be appreciated, various other polymer, natural and/or synthetic, materials may be used as a coating on the outer surface 1006. Other outer layers such as rubber, low density polyethylene, high density polyethylene, polypropylene, polyvinyl chloride, and/or nylon (polyamide) may also be used, just to name a few non-limiting examples.

Figure 11:
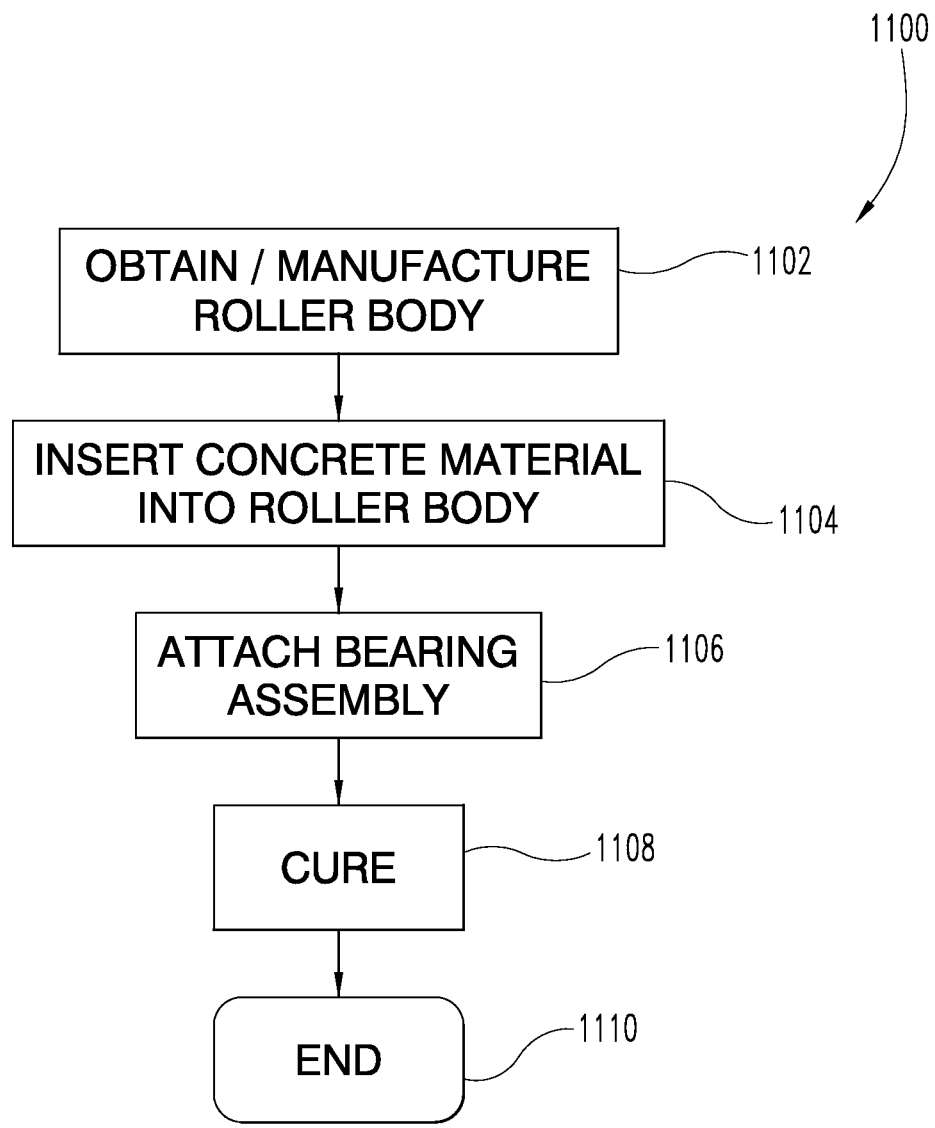
FIG. 11 is a flow diagram illustrating one method of manufacturing a conveyor roller assembly.

A technique for manufacturing the above discussed rollers will now be described with reference to flowchart 1100 shown in FIG. 11. To aid in the explanation, this technique will be described with reference to manufacturing the roller 102 illustrated in FIGS. 2-6, but it should be recognized that this technique can be used to manufacture other types of rollers. In stage 1102, the roller body 202 is obtained or otherwise provided in any number of manners. For instance, the roller body 202 can be purchased from an outside vendor and/or manufactured internally. In one example, the roller body 202 is manufactured via an extrusion process in stage 1102. Referring to FIGS. 5 and 11, after stage 1102, the concrete 501 is poured or otherwise inserted into the roller body 202 in stage 1104. In the example illustrated in FIG. 5, the concrete 501 is poured into the individual cavities 505 within the roller body 202. Again, these separate cavities 505 reduce the risk of pooling of the concrete 501. By having the concrete 501 formed integrally with the roller body 202, the need for a separate mold is eliminated. This helps to reduce the amount of equipment used to produce a concrete supported roller and the expense of obtaining and operating fixed forms. As noted before, this also allows the concrete 501 to cure during or even after final assembly of the roller 102.

In one example, the concrete material is compacted, such as by tamping the roller body 202 containing the concrete material 501 during and/or after insertion of the concrete material 501 into the roller body 202. Compaction of the concrete material 501 helps to consolidate the concrete material 501 and reduce the amount of air in the cured concrete material, which results in an increase in the strength of the concrete material. Furthermore, compacting the concrete material into the roller body may further aid in completely filling the cavities containing concrete material. For example, compacting the concrete material in narrow and/or tortuous cavities may help to place concrete material 501 throughout much, if not all, of the cavity. In some embodiments, the process of adding concrete material and compacting the concrete material is repeated until the concrete material has settled and/or the cavity is completely full of concrete.

After the concrete material 501 is inserted in stage 1104, the bearing assembly 204 is attached to the roller body 202 in stage 1106. During stage 1106, the bearing assemblies 204 are inserted into the cavities 214 at the ends 212 of the roller body 202, as is depicted in FIG. 4. As can be appreciated, the bearing assembly 204 may be attached in stage 1106 to the roller body in a number of ways. For example, the bearing assembly may be attached in stage 1106 to the roller body though a friction and/or interference fit and/or by use of an adhesive and/or screw-like threads. As discussed above, the bearing assemblies 204 have flanges 210 configured to seal the cavities 505 in the roller body 202. This allows the roller 102 to be transported and/or otherwise processed without the concrete 501 needing to be completely cured. It should be recognized that this can reduce the time required to manufacture the roller 102. In essence, the bearing assemblies 204 act as seals so as to prevent leakage of the concrete 501 from the cavities 505 in the roller body 202. In further variations, additional seals and/or gaskets can be used to further seal the cavities 505 in conjunction with the bearing assemblies 204.

After the bearing assemblies 204 are attached to the roller body 202 in stage 1106, the concrete 501 is cured in stage 1108. As noted before, the curing in stage 1108 can occur while other manufacturing processes are performed on the roller 102 and/or while the roller 102 is stored before or during final shipping. In another example, the curing in stage 1108 takes place in a controlled environment so as to maintain consistency from roller-to-roller in multiple roller manufacturing and to increase the likelihood that the cured roller will have the intended strength. Environmental characteristics such as temperature, pressure, and/or humidity may be controlled during the curing process. As can be appreciated, the environment in which the concrete material is cured is controlled such that the concrete cures within a desired period of time and likely has desired strength characteristics. Again, the concrete material 501 may only be partially cured during the curing process 1108 with further curing taking place during later stages and/or after completion of the manufacturing process. Once the concrete material is cured in stage 1108, the process concludes in stage 1110.

In another variation, one or more ultraviolet (UV) cured materials, such as UV cured coatings and/or glues, are mixed into the concrete. Other materials, such as microfibers, can also be mixed into the concrete. The UV cured material and concrete mixture is then extruded into the roller body shape with immediate UV curing via a UV lamp such that the UV material holds its shape as it exits the extruder. The bearing assemblies can then be attached to the extruded roller. In essence, the UV cured material is impregnated within the concrete to form the roller body when the UV material is cured with the UV light. With the cured UV material forming a matrix (i.e., a roller body) to hold the concrete in place the concrete is then able to more fully cure after assembly of the roller. In one example, the outside of the roller body can be coated with a material, such as plastic, to minimize scuffing or other damage to items transported on the roller. This outer coating or layer may be deposited by vapor deposition, powder coating, spraying, and/or dip coating, just to name a few non-limiting examples. It should be recognized that this technique allows the rollers to be manufactured in a relatively fast and inexpensive manner.

Figure 12:
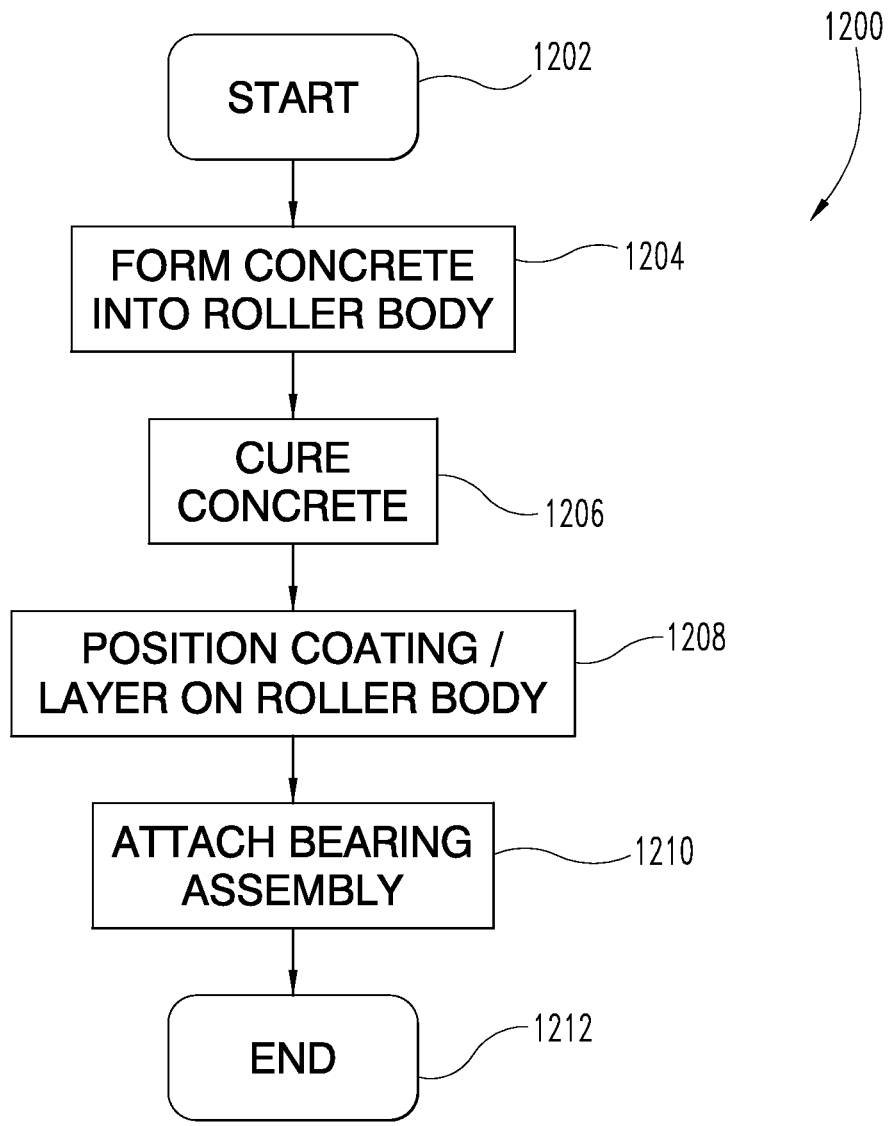
FIG. 12 is a flow diagram illustrating another method of manufacturing a conveyor roller assembly.

FIG. 12 is another flow diagram 1200 that displays one method of creating a conveyor roller, such as the one shown in FIG. 10. After starting the method in stage 1202, concrete material is formed in stage 1204 into a roller body. As can be seen, the roller body may be formed in a number of ways in stage 1204. For example, the concrete roller body may be formed by extruding the concrete into the desired shape of a roller body or by casting the roller body. In applications in which a hollow core is desired, the roller body can be formed by a process used to form concrete pipe such as by use of the packerhead process, the vibration process, or the spin/rotational process. After the roller body is formed in stage 1204, the concrete is cured in stage 1206 and optionally an outer coating and/or layer, such as a polymer material, covers the roller body. The outer coating can prevent scratching or scuffing of the material being transported over the conveyor roller. The outer coating or layer may be deposited in stage 1208 by vapor deposition, powder coating, spraying, and/or dip coating, just to name a few non-limiting examples. The outer coating or layer may also be a separate member, such as a sleeve, that is slid and/or fastened over the outer surface of the roller body.

After the outer coating and/or layer is positioned in stage 1208, the bearing assembly 204 is attached in stage 1210. The bearing assembly 204 may be attached in stage 1210 by any of the methods discussed above pertaining to bearing assemblies. Alternatively or additionally, the coating and/or layer may be used to attach the bearing assembly to the roller body. After attaching in stage 1210 the bearing assembly, the process concludes in stage 1212.

Figure 14:
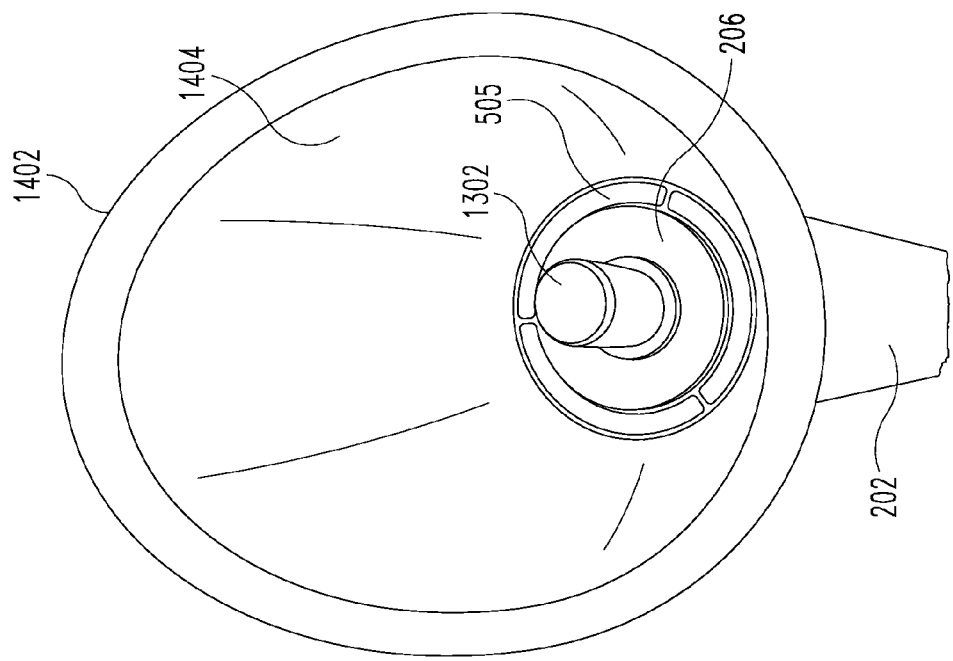
FIG. 14 is a perspective view of one end of the FIG. 13 conveyor roller assembly along with a funnel during a filling stage.
Figure 13:
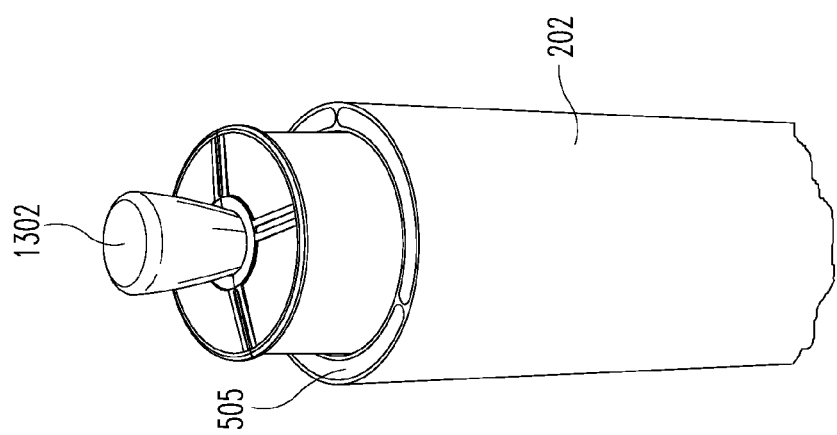
FIG. 13 is a perspective view of one end of a conveyor roller assembly during manufacture.

A specific application of the above discussed techniques will now be described with reference to FIGS. 13 and 14. In this illustrated example, the technique will be described with reference to the roller 102 illustrated in FIGS. 2-6. However, it should be recognized that this technique can be adapted to manufacture other types of rollers. Turning now to FIG. 13, a plug 1302 is inserted into the end 212 of the roller body 202 so as to prevent the concrete 501 from filling the inner cavity 524 of the roller body 202 while at the same time allowing access to the cavities 505. The opposite end of the roller body 202 can be sealed via any number of manners such that the cavities 505 at that end are sealed to prevent leakage of the concrete 501. In the illustrated example, the plug 1302 has a generally tapered shape and has an end portion that is smaller than the opening of the cavity so that the plug 1302 can be inserted into the opening of the cavity 524. As the plug 1302 is gradually inserted in to the cavity, the tapered shape of the exterior comes into contact with the perimeter of the opening of the cavity. This provides a water-tight seal between the plug 1302 and the roller body 202.

A modified funnel 1402 having a frustum shape is used to direct the concrete 501 into the cavities 505. The opening at the neck of the funnel 1402 is sized to approximate the same diameter as the outer tube 502 when attached to one end of the roller body 202, as shown in FIG. 14. Again, the end of the roller body 202 opposite of the funnel 1402 is sealed. The portion of the funnel 1402 that is attached to the roller body fits snugly around the outer tube 502 of the roller body 202 and can be secured in place by any number of manners such as through an adhesive tape.

During one test, a concrete mixture containing eight (8) ounces of Portland Cement (Type I), six (6) ounces of water, four (4) ounces of glass microsphere (S83), and two (2) teaspoons of Kuraray Reinforcing fiber was then prepared. These ingredients were mixed together and poured into the funnel. The slanted portion 1404 of funnel 1402 directed the concrete mixture into the cavities 505. When the cavities 505 were full of the concrete mixture, the roller body 202 was tamped approximately one-hundred (100) times and more concrete mixture was added to fill the cavities. The process of filling the cavities 505 with concrete and tamping was repeated until the concrete appeared settled and the cavities were full. The roller body 202 was then stored for 15 days for curing. After the 15-day curing period, the plug 1302 and funnel 1402 were removed and the bearing assembly 204 was attached.

Figure 15:
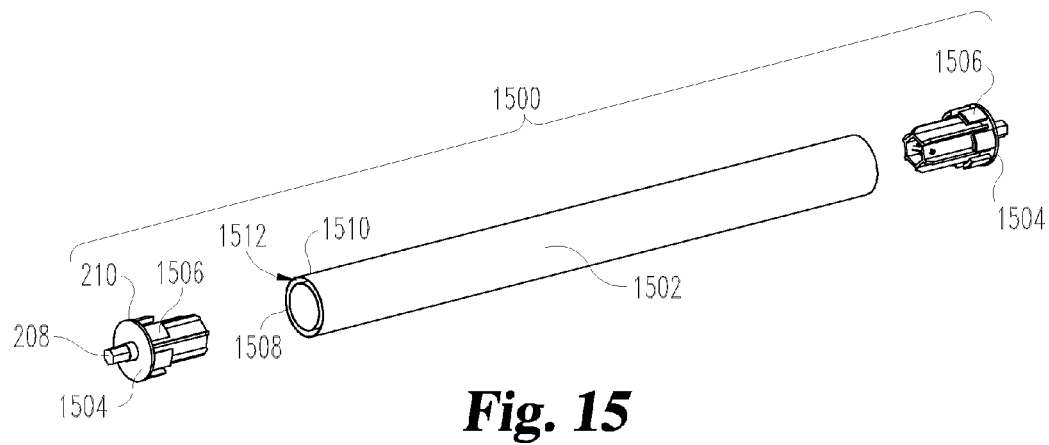
FIG. 15 is an exploded view of a conveyor roller assembly according to a further embodiment.

FIG. 15 shows an exploded view of a conveyor roller assembly 1500 according to still yet another embodiment. The conveyor roller assembly 1500 in FIG. 15 shares a number of features in common with those previously described, and for the sake of brevity as well as clarity, these common features will not be discussed again in detail the low, but rather please refer to the previous discussion of these features. Looking at FIGS. 15 and 16, the conveyor roller assembly 1500 includes a roller body 1502 and one or more bearing assemblies 1504. In the illustrated example, the bearing assemblies 1504 each include one or more spacer tabs 1506 that are used to space an inner tube 1508 from an outer tube 1510. The inner 1508 and outer 1510 tubes form a fill cavity 1512 in which the concrete is filled.

Figure 16:
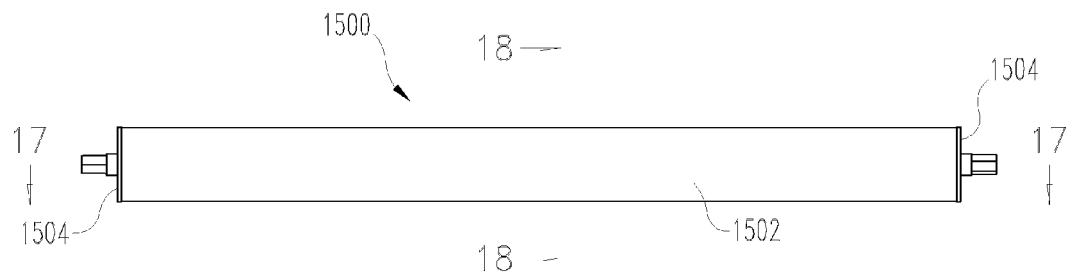
FIG. 16 is a side view of the FIG. 15 conveyor roller assembly.
Figure 17:
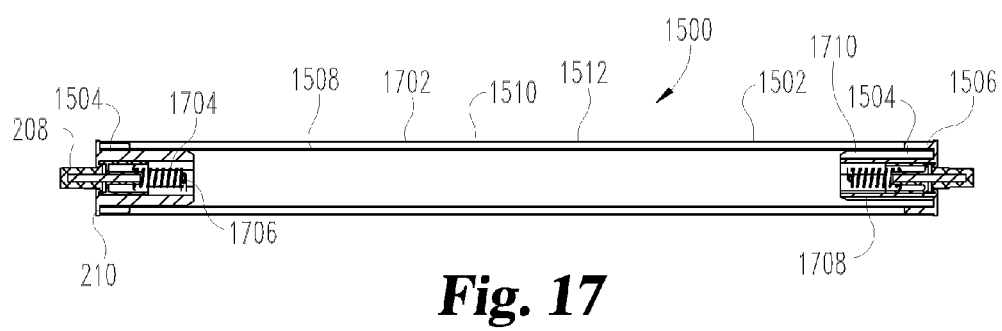
FIG. 17 is a cross-sectional view of the FIG. 15 conveyor roller assembly as taken along line 17-17 in FIG. 16.

Turning to FIG. 17, which shows a cross-sectional view of the conveyor roller assembly 1500 as taken along line 17-17 in FIG. 16, concrete 1702 fills the fill cavity 1512. The inner 1508 and outer 1510 tubes act as a mold for the concrete 1702. Like the previous examples, the bearing assemblies 1504 are configured to seal the fill cavity 1512 such that the concrete 1702 is contained within the fill cavity 1512. In one particular example, the inner 1508 and outer 1510 tubes are two clear plastic urethane tubes of different diameters. With at least one of the bearing assemblies 1504 holding the tubes in place, the spacer tabs 1506 of the bearing 1504 can be used to ensure the fill cavity 1512 has a consistent thickness. It was found that the urethane tubing is relatively inexpensive, and the clear plastic allows the manufacturer to see any air pockets or voids which would be detrimental to the integrity of the conveyor roller assembly 1500. If so desired, the outer tube 1510 can be cut off or otherwise removed after the concrete 1702 has cured, and then a wear coating can be applied to the outer surface of the concrete 1702.

Figure 18:
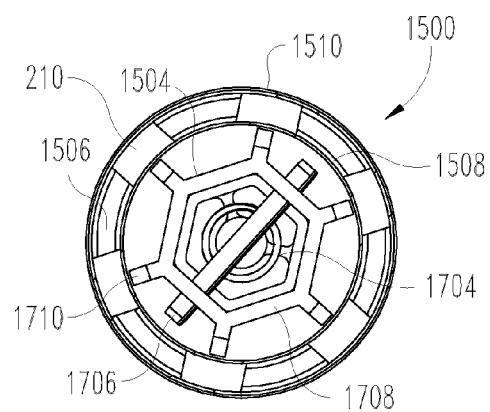
FIG. 18 is a cross-sectional view of the FIG. 15 conveyor roller assembly as taken along line 18-18 in FIG. 16.

Like before, the bearing assemblies 1504 each include the axle stub 208. Looking at FIGS. 17 and 18, the axle stub 208 is biased by a spring 1704 that is supported by a pin 1706. FIG. 18 shows a cross-sectional view of the conveyor roller assembly 1500 without the concrete 1702. FIG. 18 shows how the spacer tabs 1506 of the bearing assemblies 1504 the inner tube 1508 from the outer tube 1510 so as to form the fill cavity 1512. Each bearing assembly 1504 includes a body portion 1708 that is received inside the inner tube 1508. As shown in FIGS. 17 and 18, the body portion 1708 helps to position the inner tube 1508 within the outer tube 1510. The body portion 1708 has a series of spokes or ribs 1710 that radially extend to engage the inner tube 1508. The written 1710 facilitate easy insertion of the body portion 1708 within the inner tube 1508 by reducing the contact area between the two. As can be seen in FIG. 18, the ribs 1710 are positioned between the individual spacer tabs 1506 so as to form an interlocking type connection in order to further secure the bearing assembly 1504 to the tubes 1508, 1510. In addition, the body portion 1708 further provides a space to facilitate retraction of the axle stub 208 within the bearing assembly 1504. Like the previous examples, the bearing assemblies 1504 also have flanges 210 that are sized seal the ends of the fill cavity 1512 so as to facilitate assembly of the roller even when the concrete 1702 is not completely cured. The flanges 210 along with the inner 1508 and outer 1510 tubes form a mold for the concrete 1712. This configuration helps to simplify the curing process for the concrete.

Figure 19:
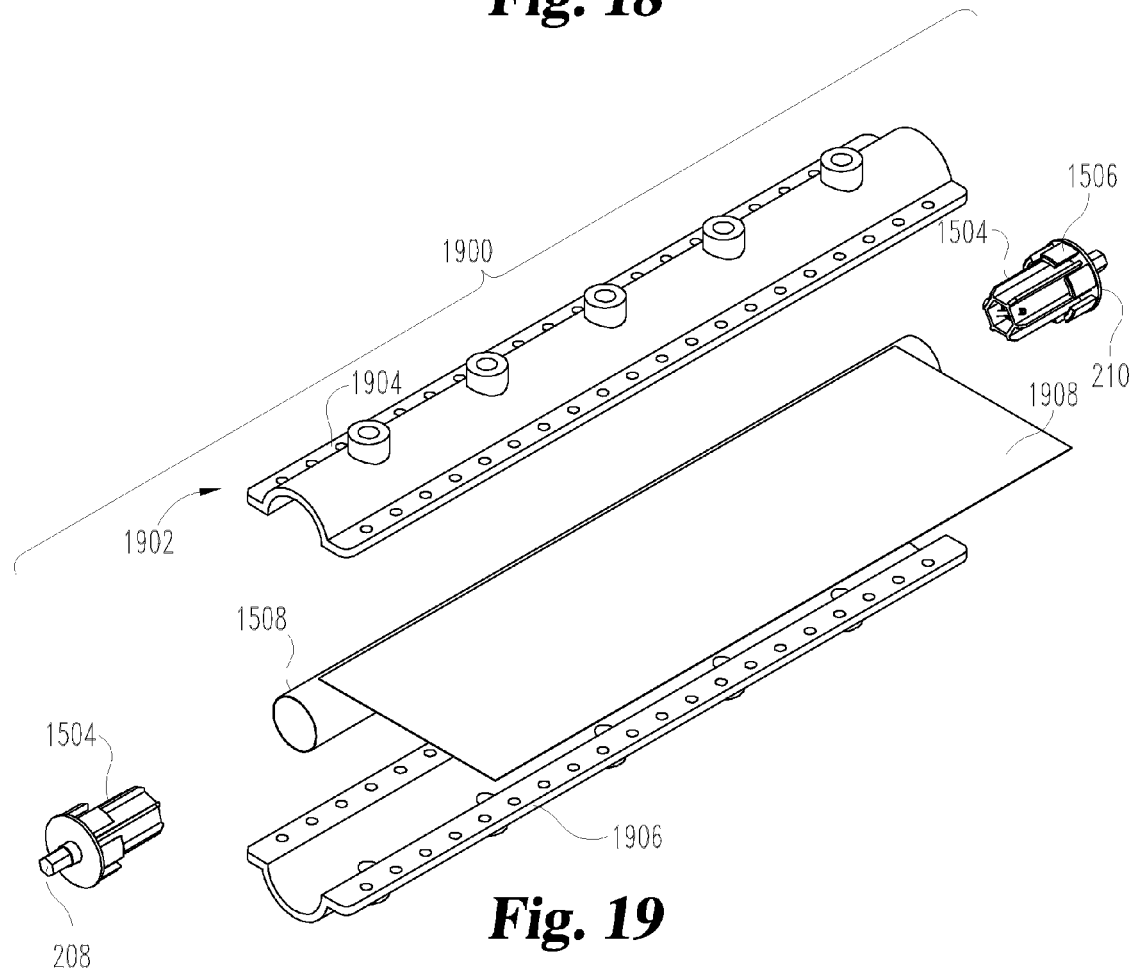
FIG. 19 is an exploded view of a conveyor roller mold system according to another embodiment.

FIG. 19 shows an exploded view of a concrete roller mold structure 1900 according to still yet another embodiment. Like the previous embodiment, the mold structure 1900 includes the bearing assemblies 1504 that support the inner tube 1508. In this particular example, however, the outer tube 1510 has been replaced with an outer mold 1902. The outer mold 1902 has a clamshell design that includes first 1904 and second 1906 mold shells. Such a construction eliminates the need of having to remove the outer tube 1508 after curing, if so desired. In the illustrated example, the inner tube 1508 is wrapped by a reinforcement sheet 1908. Specifically, the reinforcement sheet 1908 is disposed between the outer mold 1902 and the inner tube 1508 so as to further reinforce the concrete once cured. In other words, the reinforcement sheet 1908 is embedded within the resulting concrete roller so as to enhance the tensile strength of the concrete roller. In another example, the reinforcement sheet 1908 includes a fiberglass mesh (e.g., ¼ inch or less mesh) that is tightly wrapped around the inner tube 1508 and held in place with a light adhesive or glue so as to hold the fiberglass mesh within the fill cavity. This configuration adds additional strength to the concrete roller, especially for heavier applications such as pallet handling.

Figure 20:
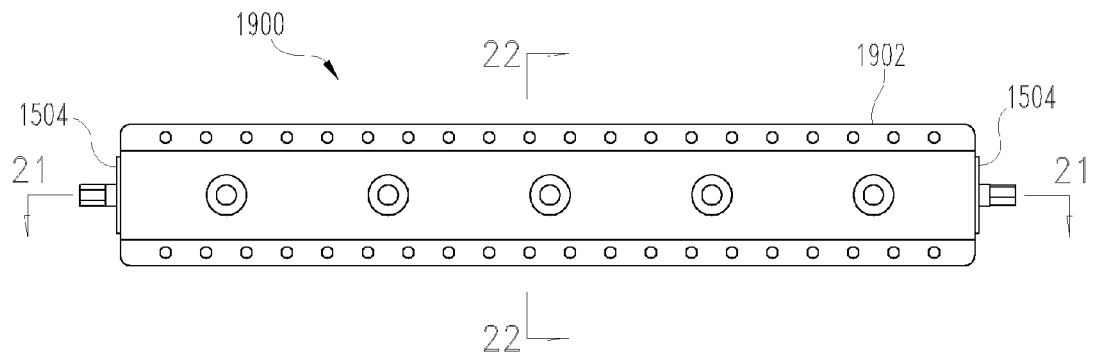
FIG. 20 is a side view of the FIG. 19 conveyor roller mold system.
Figure 21:
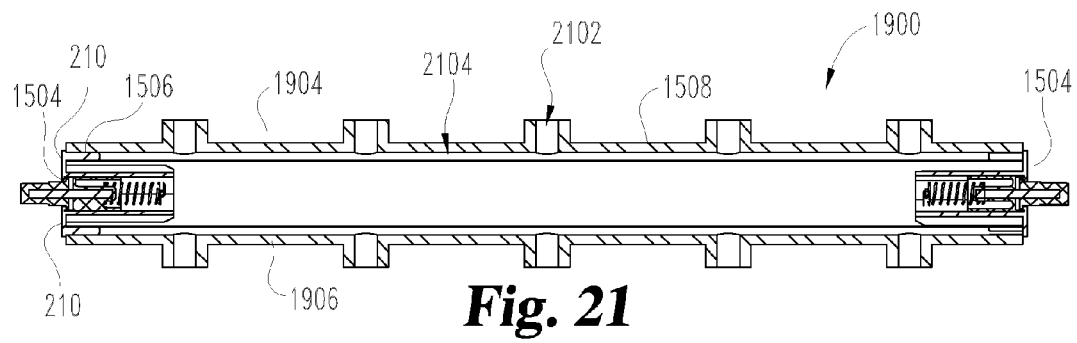
FIG. 21 is a cross-sectional view of the FIG. 19 conveyor roller mold system as taken along line 21-21 in FIG. 20.
Figure 22:
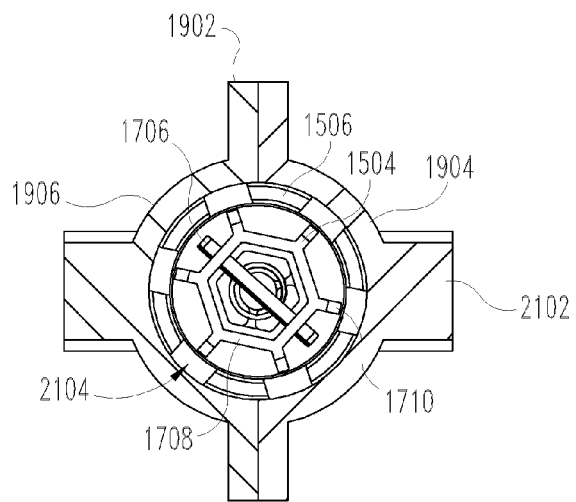
FIG. 22 is a cross-sectional view of the FIG. 19 conveyor roller mold system as taken along line 22-22 in FIG. 20.

With reference to FIGS. 20, 21, and 22, the mold shells 1904, 1906 include a series of ports 2102 that allow the concrete to be injected into a fill cavity 1512 formed between the outer mold 1902 and the inner tube 1508. Once the concrete is cured, the mold shells 1904, 1906 are separated such that the resulting concrete roller is able to be removed from the mold 1902. It should be noted that the concrete does not need to be completely cured in order to be removed from the outer mold 1902, but it should be sufficiently cured so as to maintain its shape. Once removed from the outer mold 1902, the concrete roller can be coated with a cover layer, if so desired.

It should be recognized that the above discussed conveyor rollers can be used in a wide variety of environments. Conveyor systems are available in many configurations, and the roller conveyor system 100 in FIG. 1 is representative of just one type of conveyor system. Roller conveyor systems 100 are often used to transport various objects, such as individual products, packages, cases, and/or boxes. These conveyors may also be covered with a belt made of a material such as rubber and/or plastic. Belt-over-roller conveyors are often used in powered applications and/or in applications that require the transport of delicate, unpackaged, and/or finer materials, such as woodchips or a powder. Other conveyor systems may be unpowered such as a gravity conveyor. Additionally, conveyor systems may use various shapes and sizes of rollers such as skate wheel type rollers or tapered rollers. These conveyor systems may also include and/or be combined with other systems that facilitate sorting, accumulating, and/or separating the material being transported by the conveyor system. The conveyor rollers can be powered and/or unpowered and may be oriented in various relationships to one another. For example, the frame 104 in FIG. 1 may be a flexible, expandable, and/or telescoping member that permits changing the relationship, such as distance and angle, between the rollers. Depending on the requirements, the axle hubs in the conveyor rollers described above can have a fixed axle stub design and/or a sprung type axle stub design in which the axle stub is able to move in a telescoping manner such that the conveyor roller can be readily replaced. It should be further recognized that other types of bearing assemblies or axle hubs exist besides the ones illustrated herein.

In the examples described above, the axle stubs 204 are held within the roller body 202 via a friction fit, but the axle hub 204 can be held in place in other ways, such as through adhesives and/or mechanical fasteners. In the examples illustrated in the drawings, the rollers include two axle hubs or bearing assemblies 204, but it should be recognized that other types of rollers can include more or less bearing assemblies than is shown in the drawings. For example, the roller can include a single bearing assembly that extends completely through the roller body. Other arrangements of the outer tube 502 and inner tube 504 are also contemplated. The outer tube 502 and/or inner tube 504 may be a non-circular or near circular shape such as an oval or a dodecagon, to name a few non-limiting examples. Alternatively or additionally, the inner tube 504 may also be positioned concentrically within the outer tube 502 or off-center in relation to the outer tube 502 such that the inner tube 504 and outer tube 502 do not share a central axis. All of the cavities in the roller body may contain a concrete material, or less than all of the cavities may contain concrete. In the FIG. 5 example, the spokes 511 are spaced equally around the circumference of the outer tube 502 and/or the inner tube 504. The spokes 511, however, may be grouped together and/or spaced unequally apart. The inner surface 522 of the roller body 202 may be smooth and/or textured in selected locations to ease insertion of the axle hubs 204 into the inner cavity 524 and/or resist the removal of the axle hubs 204 after insertion. The inner surface 522 may also include some sort of fastener to fasten the inner surface 522 to the axle hubs 204, such as an adhesive and/or screw-like threads to name few non-limiting examples.

In the FIG. 5 embodiment, the outer tube 502, inner tube 504, and/or spokes 511 of the roller body 202 may be made of a rigid and/or pliable material. In one example, the outer tube 502 is made of a rubber or a polymer material, such as low density polyethylene, high density polyethylene, polypropylene, polyvinyl chloride, nylon (polyamide), and/or polytetrafluoroethylene, to name a few non-limiting examples. Polymer materials offer sufficient strength properties, aid in attenuating operating noise of the roller, and may provide protection of the concrete material contained in cavities 505. Alternatively or additionally, all or part of the outer tube 502 may be made of a non-polymer material such as a metal or rubber. As can be appreciated, one may select different materials for the outer tube 502 and/or the inner tube 504 depending on the conditions in which the roller body 202 will operate and the desired wear resistance and strength properties of the roller body 202. The outer tube 502, inner tube 504, and/or spokes 511 may be made of the same or different materials. Forming the inner tube 504 of the same material as the outer tube 502 may be chosen in some embodiments for ease of manufacturing, cost of materials, and/or other reasons.

In the FIG. 5 embodiment, the cavity 524 extends through the entire length of the roller body 202, but in other variations, the inner cavity 524 may only extend through portions of the roller body 202. For example, the inner cavity 524 may only be positioned near the ends 212 of the roller body 202 so as to receive the insertable portions 208 of the bearing assemblies 204. Inner cavity 524 may also change in shape along the length of the roller body 202. For example, in one embodiment, the inner cavity 524 may have a larger cross-section at one or both ends 212 of the roller body 202 than at a portion between the ends 212 of the roller body 202.

The outer tube 502 and inner tube 504 may be formed through a wide variety of manufacturing techniques. If the tubes 502 and 504 are made of a polymer material, they may be formed by a process such as extruding, injection molding, thermal forming, and/or blow molding to name a few non-limiting examples. As can be appreciated, other methods of manufacturing the roller body 202 may be envisioned depending on the materials selected and the dimensions of the roller body 202 and its associated members.

It also should be recognized that the roller 700 illustrated in FIGS. 7-9 can be modified and or constructed differently in other embodiments. For example, the inner support structure 804 can include one or more support segments 806 instead of the two (2) illustrated in FIG. 8. In some embodiments, the outer sleeve 802 and inner support structure 804 are formed together, such as in a single piece or integrated structure. Various components of the roller 700 can be shaped differently in other embodiments. For instance, while the inner hub 814 has a hexagonal shape, it should be recognized that the inner hub 814 can be shaped differently in other embodiments. Moreover, the inner support structure 804 can include more or less spokes 816 as is illustrated in FIG. 8.

As can be appreciated, other embodiments are envisioned beyond those discussed above. For example, other embodiments contain variations of the above-described roller bodies 202, 702, and 1000. Some embodiments use more than two (2) tubes and may also have connecting portions or spokes for connecting the additional tubes or other structures to the inner tube and/or outer tube. In other embodiments, there are fewer or no connecting portions or spokes connecting the tubes. In these embodiments, the concrete material positioned between the tubes maintains the position of one tube relative to another tube.

It should be understood that only a few exemplary methods were discussed above, but limitation to these few examples is not intended. For example, it is envisioned that the various stages described above can occur in a different order then described and/or illustrated herein. Moreover, various stages can be omitted or combined together so as to occur simultaneously. Other additional acts can be reformed besides those described above. Moreover, the various acts can be performed in any number of manners. For instance, the insertion of the concrete material stage 1104 in FIG. 11 can be performed by allowing the concrete material to flow into one or more cavities in the roller body under the force of gravity, or the concrete material may be injected into a cavity by way of a pump or other pressurizing instrument, just to name some non-limiting examples. In some embodiments, the concrete material is inserted directly into specific cavities. In other embodiments, the opening to a cavity of the roller body is sealed to prevent concrete material from flowing into that cavity and concrete is generally applied to the end of the roller body. Sealing may be done by use of a sealing member such as a rubber stopper and/or a plug. In other embodiments, openings to multiple cavities may be sealed by use of one or more sealing members to prevent concrete material from flowing into those sealed cavities.

While the techniques mentioned above were described as having the concrete material mixed prior to insertion into the roller body, it is envisioned that in other embodiments, the concrete material may be mixed as it is being inserted into the roller body and/or is inserted into the roller body and mixed after insertion. In other embodiments, a combination of the above is used, with at least partial mixing of the concrete material occurring before, during, and/or after insertion.

Again, it should be understood that the various stages discussed in regards to FIGS. 11 and 12 can occur in a different order than shown, and selected stages can occur multiple times or even simultaneously. For example, the acts of attaching in stage 1106 the bearing assembly and curing 1108 the concrete material may be reversed in order or may occur simultaneously during the manufacture of the conveyor roller, for example with the curing of the concrete acting as the fastening means to secure the bearing assembly. As an example in regards to FIG. 12, the acts of positioning the outer coating in stage 1208 and/or layering and/or attaching the bearing assembly in stage 1210 may occur prior to and/or during curing of the concrete material in stage 1206.

It further should be appreciated that other types of concrete mixtures can be used in the rollers described above. For example, in applications that desire a reduced material cost for the conveyor roller, a concrete mixture that substitutes sand for glass microspheres can be used. The material cost of a concrete mixture that uses sand as a substitute for microspheres is substantially less expensive per unit volume and may still meet the strength requirements for a conveyor roller in many applications. It also should be appreciated that the reinforcing sheet 1908 in FIG. 19 can be incorporated into the other types of roller designs. Moreover, while the outer mold 1902 includes two mold shells 1904, 1906, it should be recognized that in other variations the outer mold 1902 can include more or less mold shells than are illustrated in the drawings.

It should be recognized by one of ordinary skill in the art that any alterations, further modifications and/or any further applications of the principles of the invention as described herein, as would normally occur to one skilled in the art, are contemplated.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by following claims are desired to be protected. All publications, patents, and patent applications cited in this specification are herein incorporated by reference as if each individual publication, patent, or patent application were specifically and individually indicated to be incorporated by reference and set forth in its entirety herein.

The invention claimed is:

1. An apparatus, comprising:
   a conveyor roller including
      a roller body defining a fill cavity,
      a concrete material at least partially filling the fill cavity, wherein the roller body is made from material that is different from the concrete material, and
a bearing assembly coupled to the roller body, wherein the bearing assembly is configured to facilitate rotation of the roller body.

2. The apparatus of claim 1, further comprising:
the fill cavity having an opening at an end of the roller body; and
the bearing assembly being configured to seal the opening of the fill cavity.

3. The apparatus of claim 2, wherein the bearing assembly has a flange sealing the opening of the fill cavity.

4. The apparatus according to claim 1, wherein the roller body forms a protective covering around and exterior of the concrete material to protect items transported on the conveyor roller from the concrete material.

5. The apparatus according to claim 1, further comprising:
the roller body defining an inner cavity;
the fill cavity surrounding the inner cavity; and
the inner cavity being empty.

6. The apparatus according to claim 1, wherein the roller body includes:
an outer sleeve; and
an inner support structure received in the outer sleeve.

7. The apparatus according to claim 6, wherein the inner support structure includes two or more segments joined together.

8. The apparatus according to claim 6, wherein the inner support structure includes:
an inner hub;
one or more spokes extending in a radially outward direction from the inner hub; and
a rim connecting the spokes together at a position radially outward from the inner hub.

9. The apparatus according to claim 8, wherein the outer sleeve defines one or more grooves in which the one or more spokes are received.

10. The apparatus according to claim 1, wherein the bearing assembly includes a sprung type bearing assembly including an axle stub configured to rotate relative to the bearing assembly and move in a telescoping fashion.

11. The apparatus according to claim 1, wherein the bearing assembly includes a flange configured to seal the fill cavity.

12. The apparatus according to claim 1, wherein the concrete material includes an engineered cementitious concrete.

13. The apparatus according to claim 1, further comprising:
a conveyor frame in which the conveyor roller is received, wherein the conveyor roller is configured to rotate relative to the conveyor frame.

14. An apparatus, comprising:
a conveyor roller including
a roller body defining a fill cavity,
a concrete material at least partially filling the fill cavity, and
a bearing assembly coupled to the roller body, wherein the bearing assembly is configured to facilitate rotation of the roller body; and
wherein the roller body includes one or more spokes that segment the fill cavity into separate cavities to reduce pooling of the concrete material.

15. An apparatus, comprising:
a conveyor roller including
a roller body including a concrete material, wherein the concrete material has an outer surface,
a bearing assembly coupled to the roller body, wherein the bearing assembly is configured to facilitate rotation of the roller body, and
a cover layer covering the outer surface of the roller body, wherein the cover layer is made from a material having greater tensile strength than the concrete material to enhance the tensile strength of the conveyor roller.

16. The apparatus according to claim 15, wherein the roller body is composed of plastic.

17. The apparatus according to claim 15, wherein the roller body is hollow.

18. The apparatus according to claim 15, wherein the roller body includes an inner tube radially disposed inside the concrete material.

19. The apparatus according to claim 18, wherein the roller body includes an outer tube, wherein the inner tube is received in the outer tube, wherein a fill cavity is defined between the outer tube and the inner tube, wherein the outer tube forms the cover layer.

20. The apparatus according to claim 15, wherein the cover layer includes a coating on the outside of the concrete material.

21. The apparatus according to claim 15, wherein the roller body is solid with an interior filled with the concrete material.

22. The apparatus according to claim 15, wherein the roller body includes:
an outer sleeve; and
an inner support structure received in the outer sleeve.

23. The apparatus according to claim 22, wherein the inner support structure includes two or more segments joined together.

24. The apparatus according to claim 15, wherein the conveyor roller has inertial spinning properties the same as a steel roller.

25. The apparatus according to claim 15, wherein the bearing assembly includes a sprung type bearing assembly including an axle stub configured to rotate relative to the bearing assembly and move in a telescoping fashion.

26. The apparatus according to claim 15, wherein:
the roller body defines a fill cavity; and
the bearing assembly includes a flange configured to seal the fill cavity.

27. The apparatus according to claim 15, wherein the conveyor roller includes a second bearing assembly coupled to the roller body.

28. The apparatus according to claim 15, wherein the concrete material includes an engineered cementitious concrete.

29. The apparatus according to claim 15, further comprising a reinforcement sheet embedded in the concrete material.

30. The apparatus according to claim 15, further comprising:
a conveyor frame in which the conveyor roller is received, wherein the conveyor roller is configured to rotate relative to the conveyor frame.

31. An apparatus, comprising:
a conveyor roller including
a roller body defining a fill cavity, the roller body including
a concrete material at least partially filling the fill cavity,
an inner tube radially disposed inside the concrete material, and
an outer tube, wherein the inner tube is received in the outer tube, wherein the fill cavity is defined between the outer tube and the inner tube, wherein at least the outer tube is clear for visualizing voids in the concrete material, and a bearing assembly coupled to the roller body, wherein the bearing assembly is configured to facilitate rotation of the roller body.

32. An apparatus, comprising:
a conveyor roller including
a roller body including
a concrete material, wherein the concrete material has an outer surface,
an outer sleeve, and
an inner support structure received in the outer sleeve, wherein the inner support structure includes an inner hub,
one or more spokes extending in a radially outward direction from the inner hub; and
a rim connecting the spokes together at a position radially outward from the inner hub,
a bearing assembly coupled to the roller body, wherein the bearing assembly is configured to facilitate rotation of the roller body, and
a cover layer covering the outer surface of the roller body.

33. The apparatus according to claim 32, wherein the outer sleeve defines one or more grooves in which the one or more spokes are received.

34. An apparatus, comprising:
a conveyor roller including
a roller body defining a fill cavity,
a concrete material at least partially filling the fill cavity,
a bearing assembly coupled to the roller body, wherein the bearing assembly is configured to facilitate rotation of the roller body, and
wherein the bearing assembly includes one or more spacer tabs configured to keep the thickness of the fill cavity consistent.

35. The apparatus according to claim 34, wherein the bearing assembly includes a body portion with one or more ribs radially extending therefrom.

36. The apparatus according to claim 35, wherein the spacer tabs and the ribs are radially oriented in an alternating manner.

37. An apparatus, comprising:
a conveyor roller including
a roller body including a concrete material, wherein the concrete material has an outer surface,
a bearing assembly coupled to the roller body, wherein the bearing assembly is configured to facilitate rotation of the roller body,
a cover layer covering the outer surface of the roller body, and
wherein the bearing assembly includes a body portion with one or more ribs radially extending therefrom.

38. The apparatus according to claim 37, wherein:
the bearing assembly includes one or more spacer tabs; and
the spacer tabs and the ribs are radially oriented in an alternating manner.

39. A method, comprising:
holding a concrete material in place with a roller body;
securing a bearing assembly to the roller body; and
curing the concrete material while incorporated with the roller body.

40. The method according to claim 39, wherein said holding the concrete material in place includes pouring the concrete material into a fill cavity of the roller body.

41. The method of claim 40 further comprising:
wherein the fill cavity has an opening; and
sealing the opening of the fill cavity with the bearing assembly.

42. The method of claim 41, further comprising:
wherein the bearing assembly includes a flange; and
wherein said sealing the opening includes sealing the opening with the flange of the bearing assembly during said securing the bearing assembly.

43. The method according to claim 39, wherein said holding the concrete material in place includes:
placing ingredients of the concrete material inside a fill cavity of the roller body; and
mixing the ingredients of the concrete material when inside the fill cavity of the roller body.

44. The method of claim 39, wherein said curing occurs at least in part after said holding the concrete material in place.

45. The method of claim 39, wherein said curing occurs at least in part after said securing the bearing assembly to the roller body.

46. The method of claim 39, further comprising:
assembling the roller body by inserting an inner tube inside an outer tube;
wherein said securing the bearing assembly includes spacing the outer tube from the inner tube with one or more spacer tabs of the bearing assembly; and
wherein said holding the concrete material in place includes filling the concrete material in the space between the inner tube and the outer tube.

47. The method of claim 39, wherein said holding the concrete material in place includes:
mixing the concrete material with a ultraviolet light cured material to form a mixture;
extruding the mixture; and
curing the ultraviolet cured material in the mixture with an ultraviolet light.

48. The method of claim 39, further comprising:
applying an outer coating to the concrete material.

49. The of claim 39, further comprising:
creating an engineered cementitious concrete by mixing fibers into the concrete material.

50. The method of claim 39, further comprising:
wherein the bearing assembly and the roller body form a conveyor roller; and
installing the conveyor roller into a conveyor frame.

51. The apparatus according to claim 1, wherein the roller body includes an inner tube radially disposed inside the concrete material.

52. The apparatus according to claim 51, wherein the roller body includes an outer tube, wherein the inner tube is received in the outer tube, wherein the fill cavity is defined between the outer tube and the inner tube.

* * * * *